United States Patent
Ho

(10) Patent No.: US 11,555,634 B2
(45) Date of Patent: Jan. 17, 2023

(54) SYSTEMS AND METHODS FOR SHIELDING FALLING PARTICLES WITHIN A SOLAR THERMAL FALLING PARTICLE RECEIVER

(71) Applicant: National Technology & Engineering Solutions of Sandia, LLC, Albuquerque, NM (US)

(72) Inventor: Clifford K. Ho, Albuquerque, NM (US)

(73) Assignee: National Technology & Engineering Solutions of Sandia, LLC, Albuquerque, NM (US)

(*) Notice: Subject to any disclaimer, the term of this patent is extended or adjusted under 35 U.S.C. 154(b) by 244 days.

(21) Appl. No.: 15/981,363

(22) Filed: May 16, 2018

(65) Prior Publication Data
US 2018/0335230 A1    Nov. 22, 2018

Related U.S. Application Data

(60) Provisional application No. 62/508,201, filed on May 18, 2017.

(51) Int. Cl.
*F24S 40/10* (2018.01)
*F24S 20/20* (2018.01)
*F24S 80/20* (2018.01)

(52) U.S. Cl.
CPC .............. *F24S 40/10* (2018.05); *F24S 20/20* (2018.05); *F24S 80/20* (2018.05)

(58) Field of Classification Search
CPC ................................... F24S 40/10; F24S 80/50
USPC ........................................................ 126/570
See application file for complete search history.

(56) References Cited

U.S. PATENT DOCUMENTS

| | | | | |
|---|---|---|---|---|
| 1,074,219 A | * | 9/1913 | Skiff | F24S 23/30 126/681 |
| 3,884,414 A | * | 5/1975 | Baer | F24S 50/20 236/49.1 |
| 4,047,517 A | * | 9/1977 | Arnberg | F24S 23/70 126/648 |
| 4,081,934 A | | 4/1978 | Franz | |
| 4,171,695 A | | 10/1979 | Sletten | |

(Continued)

FOREIGN PATENT DOCUMENTS

| | | | | |
|---|---|---|---|---|
| DE | 4336503 A1 | * | 4/1995 | ............. B01J 19/12 |
| JP | 55102858 A | * | 8/1980 | |

(Continued)

OTHER PUBLICATIONS

Falcone, P. K.; "Assessment of a Solid Particle Receiver for a High Temperature Solar Central Receiver System"; Sandia National Laboratories; Feb. 1985 (Year: 1985).*

*Primary Examiner* — Jorge A Pereiro
*Assistant Examiner* — Logan P Jones
(74) *Attorney, Agent, or Firm* — Daniel J. Jenkins

(57) ABSTRACT

Systems and methods for falling particle receivers are disclosed that include shield or deflector structures around the receiver aperture to reduce wind effects and/or heat losses from the falling particles. External and internal structures are disclosed that can be tailored to reduce particle, thermal, and radiative losses from within the cavity receiver due to external wind and the falling particles that are irradiated within the receiver. Structures of varying shapes, sizes, and composition (transparent, reflective) are described.

3 Claims, 3 Drawing Sheets

(56) References Cited

U.S. PATENT DOCUMENTS

| | | | |
|---|---|---|---|
| 4,220,137 A | 9/1980 | Tesch et al. | |
| 4,257,404 A | 3/1981 | Steinberg | |
| 4,290,779 A * | 9/1981 | Frosch | C10J 3/56 126/684 |
| 4,324,947 A * | 4/1982 | Dumbeck | F24S 30/425 126/684 |
| 4,643,168 A * | 2/1987 | Butler | F24S 80/20 126/650 |
| 4,848,320 A * | 7/1989 | Burns | F24S 30/425 126/682 |
| 6,571,789 B1 * | 6/2003 | Mora | E04H 4/106 126/565 |
| 6,911,110 B2 * | 6/2005 | Blackmon, Jr. | F24S 23/30 156/322 |
| 8,109,265 B1 * | 2/2012 | Kolb | F24S 20/20 126/684 |
| 8,111,460 B1 * | 2/2012 | Huang | F21S 11/00 359/591 |
| 2008/0250735 A1 * | 10/2008 | Patterson | E04D 13/033 52/200 |
| 2009/0283144 A1 * | 11/2009 | Hebrink | G02B 1/105 136/259 |
| 2010/0071686 A1 * | 3/2010 | Nix | F24S 20/30 126/684 |
| 2013/0068217 A1 * | 3/2013 | Al-Ansary | F24S 70/30 126/680 |
| 2014/0251307 A1 * | 9/2014 | Nix | F24S 50/20 126/600 |
| 2017/0040930 A1 * | 2/2017 | Mirzaei Ziapour | F24S 23/77 |

FOREIGN PATENT DOCUMENTS

| | | |
|---|---|---|
| WO | 2010118038 A1 | 10/2010 |
| WO | WO-2010118038 A1 * | 10/2010 ............. F24S 23/30 |

* cited by examiner

SYSTEMS AND METHODS FOR SHIELDING FALLING PARTICLES WITHIN A SOLAR THERMAL FALLING PARTICLE RECEIVER

RELATED APPLICATION

This application claims priority to U.S. Provisional Patent Application No. 62/508,201, filed on May 18, 2017, entitled "Systems and Methods for Shielding Falling Particles within A Solar Thermal Falling Particle Receiver," the entirety of which is incorporated herein by reference in its entirety.

STATEMENT OF GOVERNMENT INTEREST

The United States Government has rights in this invention pursuant to Contract No. DE-NA0003525 between the United State Department of Energy and National Technology & Engineering Solutions of Sandia, LLC, for the operation of the Sandia National Laboratories.

FIELD

The present disclosure is generally directed to concentrating solar power receivers, and more particularly to solar receivers including shielding members for particle receivers to mitigate the negative impacts of external wind and internal convection on particle and heat losses through the aperture of the cavity receiver.

BACKGROUND

A popular design of concentrating solar power (CSP) systems use mirrors to concentrate and direct sunlight to the top of a tower where a CSP receiver collects energy by heating a heat transfer fluid, such as a molten salt or water/steam. The fluid may be used to drive an engine connected to an electrical power generator or store energy for later use. Within the field of CSP, there is interest in using falling solid particles as the heat transfer medium, as opposed to steam or molten salt, because high melting point (MP) particles, such as those with MPs greater than 1000° C. may be used. Recent testing has shown that a significant amount of particles can be lost through the solar receiver's aperture (the aperture is the opening in the receiver where the concentrated sunlight is focused) due to wind currents, air entrainment, and convection within the receiver.

A need remains for methods and systems that can shield the falling particles of a falling particle receiver from wind and reduce particle and heat losses through the aperture.

SUMMARY OF THE DISCLOSURE

The present disclosure is directed to systems and methods that shield falling particles within a falling particle receiver from wind and reduce particle and heat losses through the aperture.

According to embodiments of the disclosure, a falling particle receiver is disclosed that includes a housing comprising an aperture having a border surrounding the aperture, the aperture for receiving concentrated solar energy into an interior space of the housing and one or more structures attached to and protruding from the housing proximate to the aperture.

In other embodiments of the disclosure, a falling particle receiver is disclosed that includes a housing comprising an aperture having a border surrounding the aperture, the aperture for receiving concentrated solar energy, and one or more structures across the aperture.

In other embodiments of the disclosure, a falling particle receiver is disclosed that includes a housing comprising an aperture having a border surrounding the aperture, the aperture for receiving concentrated solar energy into an interior space of the housing, and one or more baffles attached to corresponding one or more interior surfaces of the housing.

One advantage of this disclosure is providing a falling particle receiver that improves heat transfer to the falling particles by reducing convective and radiative heat losses via the use of the wind deflectors.

Another advantage of this disclosure is the mitigation of wind effects on particle flow through the cavity receiver to enable a more stable particle flow to reduce particle dispersion and increase the opacity of the particle curtain.

Another advantage of this disclosure is the mitigation of particle loss through the aperture.

Another advantage of this disclosure is the mitigation of heat loss through the aperture.

Other features and advantages of the present disclosure will be apparent from the following more detailed description of the preferred embodiment, taken in conjunction with the accompanying drawings which illustrate, by way of example, the principles of the disclosure.

BRIEF DESCRIPTION OF THE DRAWINGS

The accompanying drawings, which are hereby incorporated into the specification, illustrate one or more embodiments of the present invention and, together with the description, explain the principles of the invention. The drawings are only for illustrating one or more preferred embodiments of the invention and are not to be construed as limiting the invention. In the drawings.

DETAILED DESCRIPTION

Figure 1A:
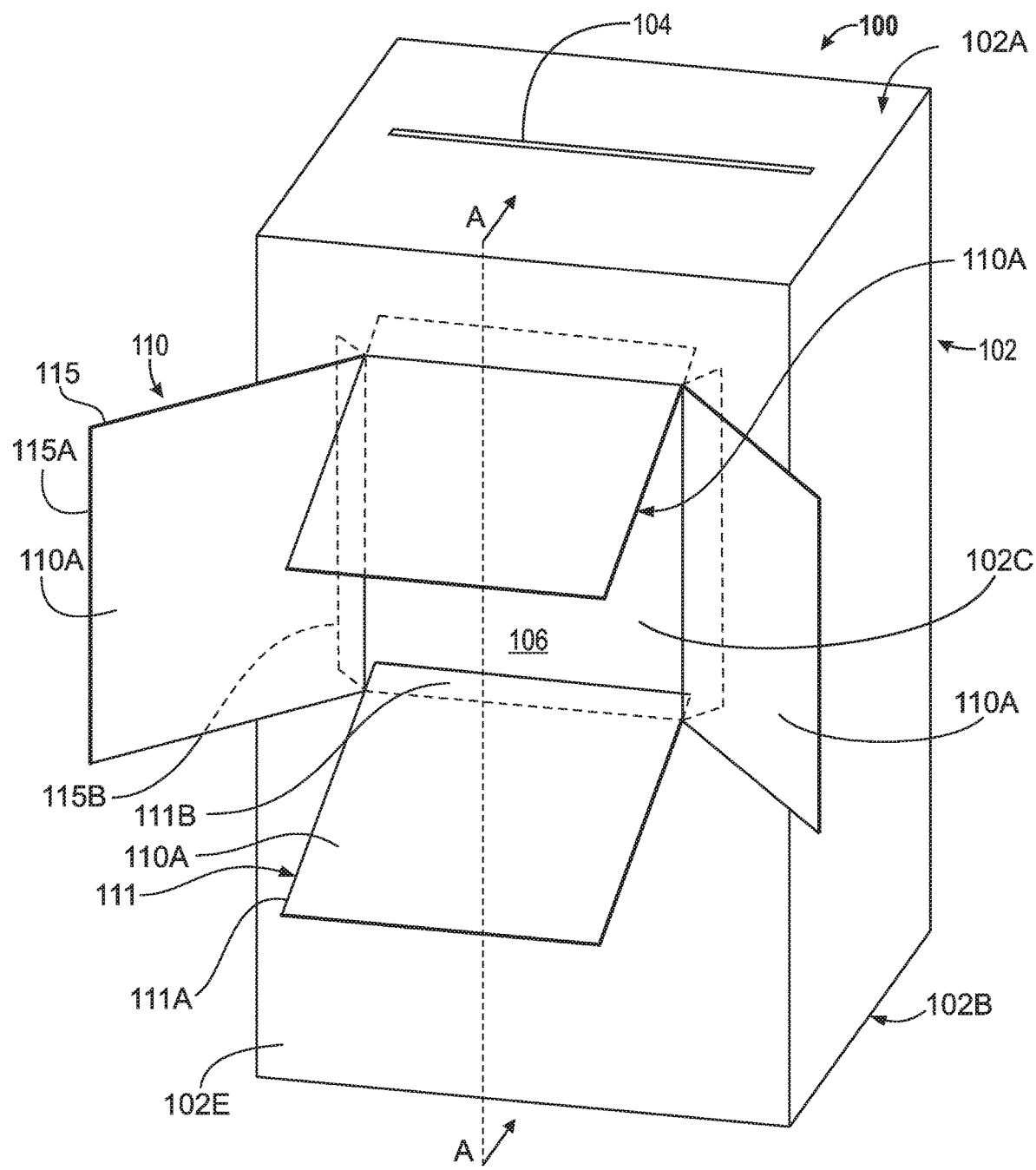
FIG. 1A illustrates a falling particle receiver according to an embodiment of the disclosure.

The present disclosure is directed to systems and methods to mitigate the effects of wind on particle and heat loss through the aperture. In various embodiments, the systems include devices that include one or more structures including wind deflectors attached to the outside of the receiver, panels covering or partially covering the receiver aperture, which will hereafter simply be referred to as "aperture," and panels or baffles attached inside the receiver. In an embodiment, imagers and/or sensors may be used to adjust deflectors and panels in real-time to compensate for different wind directions and speeds. Structures may be opaque, transparent or reflective. As used herein, the term "reflective" is defined as having a solar reflectance greater than 50% of the incident radiation. In an embodiment, the surface may be a mirrored surface. As used herein, the term "transparent" is defined as having a solar transmittance of greater than 80% of the incident radiation.

The systems and methods mitigate wind effects on the particle flow through the cavity receiver. Previous studies have shown that external wind can disrupt the falling particle curtain and decrease the opacity and solar absorption of the particle curtain. The systems and methods further reduce the loss of particles through the aperture. Previous studies have shown that external wind can cause particles to be sucked or blown out the aperture. The systems and methods also mitigate heat loss through the aperture. By reducing external wind flow into and out of the aperture, convective heat loss can be reduced. In addition, the use of transparent coverings over the aperture using quartz windows or segmented tubes will reduce the thermal (infrared) radiation loss. For example, by using a quartz covering over the aperture, quartz having a transmission cutoff at around 3 microns, thermal radiation loss can be reduced.

In an embodiment, deflectors attached around and proximate to the aperture to mitigate the effects of wind on particle and heat loss through the aperture. In an embodiment, one or more deflectors may be used. In an embodiment, the deflectors may include a reflective surface to reflect solar spillage (light that would miss the aperture) back toward the aperture. As such, the wind deflectors can act as a secondary concentrator to further heat the particles falling through the cavity.

In an embodiment, an aperture cover may be placed over or partially over the aperture to mitigate particle and/or heat loss. The cover may be transparent and formed of a high temperature material, such as, but not limited to quartz glass or silicon carbide. In an embodiment, the cover may include two or more segments that partially cover the aperture. In an embodiment, the segments may be flat, curved (concave or convex), wavy or of another shape that is wind blocking and/or light transparent or focusing. In an embodiment, the segments may be a plurality of transparent, half-segmented, concave tubes placed across the aperture.

In another embodiment, internal baffles and/or deflectors may be disposed within the cavity of the receiver to reduce particle and heat losses. In an embodiment, the baffles and/or deflectors may be positioned and oriented to mitigate particle loss and convective heat loss out the aperture.

FIG. 1 illustrates a high temperature, concentrating solar falling particle receiver (receiver) 100 according to an embodiment of the disclosure. As can be seen in FIG. 1, the receiver 100 includes a housing 102 having an opening or inlet 104 in the top 102A for receiving a fluid, such as, but not limited to fluidized particles. The particles are received in the inlet 104 and flow downward through the receiver 100 to an outlet (not shown) proximate the bottom 102B, where the particles are discharged.

The receiver 100 further includes an opening or aperture 106. The aperture 106 provides access to the internal or interior space 102C of the receiver 102. Concentrated solar light can be focused on the aperture 106 to illuminate particles falling through the interior 102C of the receiver 102. The concentrated solar light may be provided by a plurality of mirrors or heliostats (not shown), or by other light concentrating devices.

Panels 110 are attached to the housing 102 around and proximate the aperture 106. In this exemplary embodiment, proximate is adjacent the aperture 106. In other words, the panels are adjacent to the edges of the housing (not shown, but covered by the panels 110) that define the aperture 106. In other embodiments, proximate may be within a distance to mitigate wind passing near to or entering the aperture 106. In an embodiment, proximate may be within one meter of the aperture.

The panels 110 have a reflective surface 110A that is the surface on the side of the panel leading towards the aperture. In this exemplary embodiment, the surface 110A is formed of a reflective material of silver. In another embodiment, the surface 110A may be a reflective material or coating to reflect incident light that strikes the panels (spillage) back toward the aperture.

In this exemplary embodiment, there are four panels that surround the aperture, however, in other embodiments, there may be one or more panels that surround or partially surround the aperture. In this exemplary embodiment, the panels have a generally square shape, in other embodiments, the panels may have other shapes including, but not limited to square, rectangular, triangular, hexagonal, or wedge.

As can further be seen in FIG. 1, the panels 110 extend into the interior space 102C. For example, panel 111 has a first portion 111A that is external to the receiver 102 and a second portion 111B that is internal to the receiver 102. The opposite panel extends similarly into the interior space 102C. In another example, panel 115 includes a first portion 115A external to the receiver and a second portion 115B that is internal to the receiver 102. To describe the configuration, the first portion 115A leads into the aperture 106, and the second portion 115B then bends or leads away from the aperture 106. The opposing panel has a mirror configuration to panel 115.

Figure 1B:
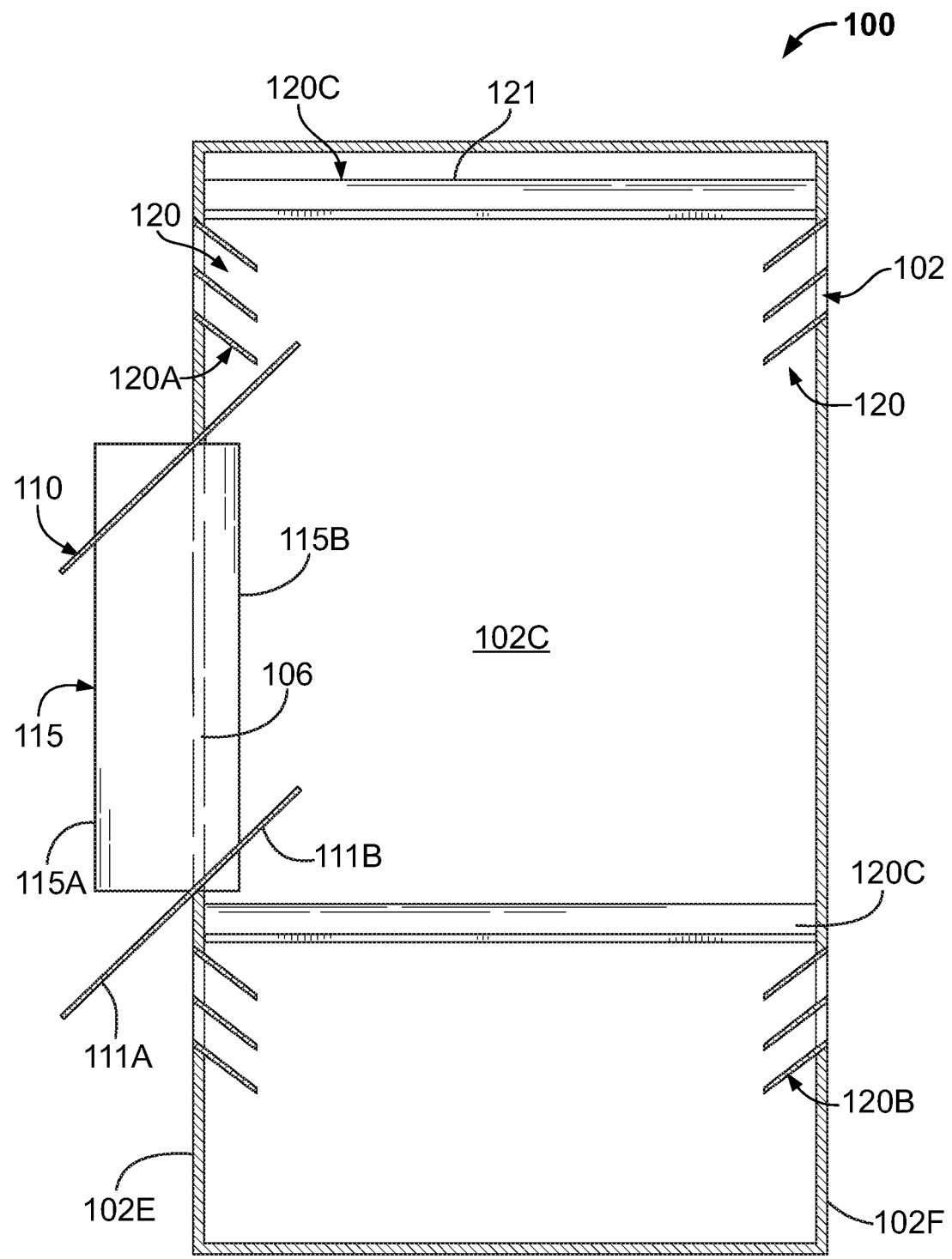
FIG. 1B is a side cut-away view of the falling particle receiver of FIG. 1A.

The second portions of the panels internal to the receiver 102 reduce the radiative and convective heat loss from within the cavity receiver. As can be seen in FIG. 1B, the receiver 102 includes internal baffles 120. The internal baffles 120 include front internal baffles 120A on the front wall 102E of the receiver 102 and rear internal baffles 120B on the rear wall 102F of the receiver 102. In this exemplary embodiment, the receiver 100 includes three internal baffles above and below the aperture 106 on both the front and rear walls 102E, 102F. In other embodiments, the receiver 100 may include one or more baffles on the front and/or rear walls. The receiver also includes side internal baffles 120C, that angle downward similar to front and rear internal baffles 120A, 120B. In this exemplary embodiment, the receiver 100 includes one internal side baffle above and one internal side baffle below the aperture 106. The extending of the deflectors 110 into the internal space 102C can be more clearly seen in FIG. 1B, as for example, deflector 115 is shown with an external portion 115A and an internal portion 115B, as can external 111A and internal 111B portions of deflectors 111 in general. In this exemplary embodiment, the internal baffles have a panel or louvered shape and are directed downward and in the direction of the falling particles. In other embodiments, the internal baffles may have panel, sheet, rod, tubing or other flow directing shape.

Figure 2:
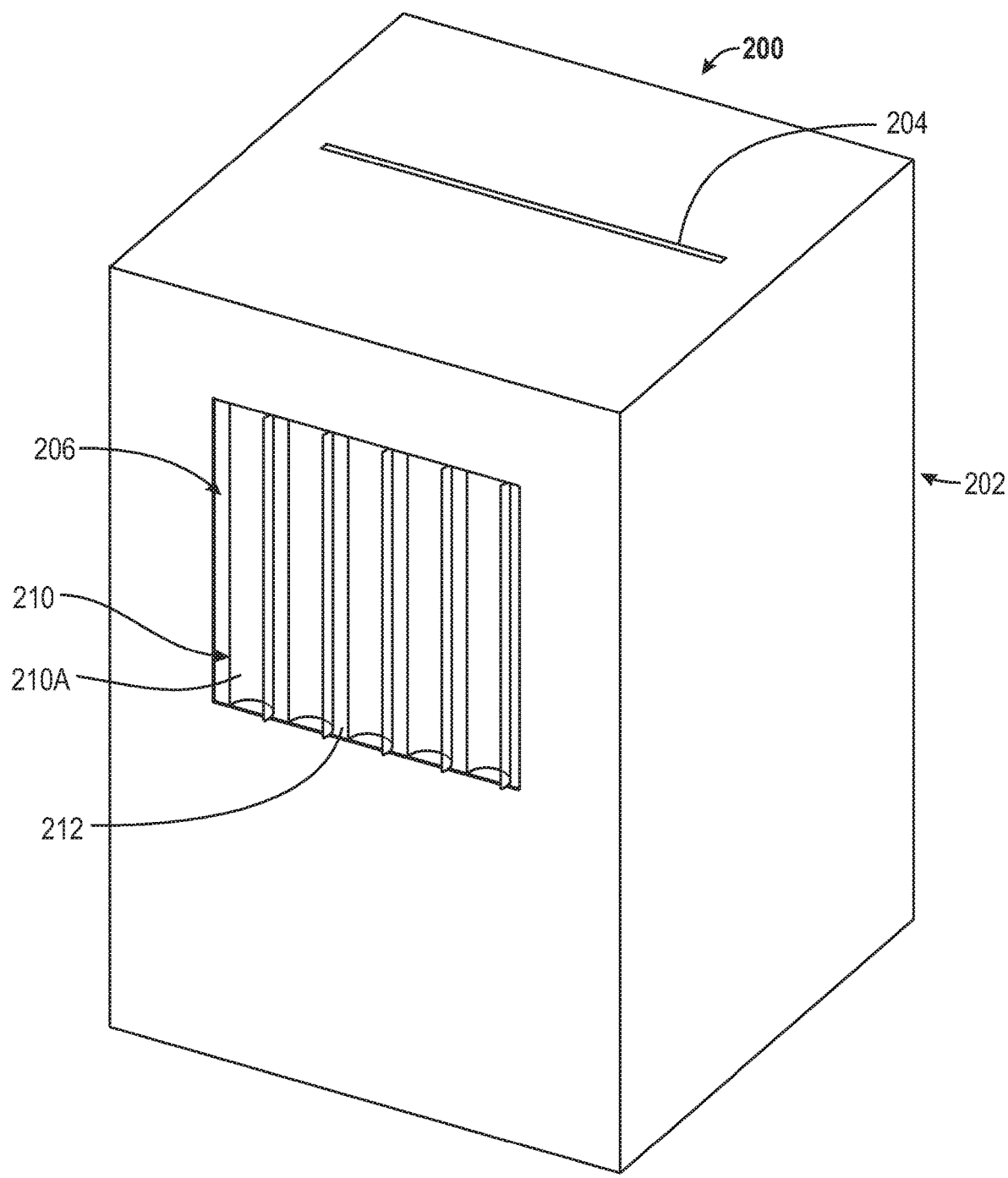
FIG. 2 illustrates a falling particle receiver according to another embodiment of the disclosure.

FIG. 2 illustrates a high temperature, concentrating solar falling particle receiver (receiver) 200 according to another embodiment of the disclosure. As can be seen in FIG. 2, the receiver 200 includes a housing 202 having an opening 204 for receiving a fluid, such as, but not limited to particles, which flow downward through the receiver 200 to an outlet (not shown) where the particles are discharged. The particles are illuminated through an opening or aperture 206 by concentrated sunlight from one or more mirrors or heliostats (not shown).

In this exemplary embodiment, the housing 202 includes structures 210 spanning across the aperture 206. In this exemplary embodiment, the structures 210 are a plurality of troughs, lenses or split tubing members 210. Gaps 212 separate the split tubing members 210. In this exemplary embodiment, the concave surface 210A of the split tubing 210 faces outward toward irradiance. In other embodiments, other structures, such as flat windows, rods, tubing, or panels may be attached across some or all of the aperture 206. In this exemplary embodiment, the structures are transparent to sunlight, in other embodiments, the structures may be semi-transparent or reflective to redirect the incident light toward the interior of the cavity receiver.

In other embodiments, the structures may be internal to the housing. For example, the structures may be baffles, tubes, rods, or panels that redirect the light toward the falling particles and/or that mitigate wind currents from entering or leaving the aperture. The internal structures are oriented and positioned to reduce particle and heat loss through the aperture. The internal structures may have similar structure to the internal baffles shown in FIG. 1B.

The invention being thus described, it will be obvious that the same may be varied in many ways. Such variations are not to be regarded as a departure from the spirit and scope of the invention, and all such modifications, as would be obvious to one skilled in the art, are intended to be included within the scope of the appended claims. It is intended that the scope of the invention be defined by the claims appended hereto. The entire disclosures of all references, applications, patents and publications cited above are hereby incorporated by reference.

In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure.

What is claimed is:

1. A falling particle receiver, comprising:
   a housing comprising an aperture having a border surrounding the aperture, the aperture for receiving concentrated solar energy;
   the housing further comprising a top, a bottom, a front wall and a rear wall, the aperture located on the front wall, the top, bottom, front wall and rear wall defining an interior space;
   the top wall comprising an opening to the interior space; and
   one or more structures across the aperture; and
   wherein the one or more structures comprise one or more lenses, wherein the one or more lenses each span from a first border surface to a second border surface; and
   wherein the one or more lenses comprise concave surfaces facing outward to irradiance; and
   wherein the one or more lenses are capable of receiving concentrated solar energy; and
   wherein the one or more structures comprise one or more quartz half shells that span from a first border surface to a second border surface.

2. The receiver of claim 1, wherein the one or more structures are formed of a transparent material.

3. The receiver of claim 1, wherein the one or more structures are two or more structures separated by a gap that allows a portion of incident light to pass through the aperture without impinging the two or more structures.

* * * * *